(12) United States Patent
Merl et al.

(10) Patent No.: US 8,942,916 B2
(45) Date of Patent: Jan. 27, 2015

(54) AVIONIC SYSTEM FOR EMERGENCY INTERCEPTION IN CASE OF IMMINENT DAMAGES OF AIRCRAFT FLEETS FOLLOWING NATURAL DISASTER EVENTS

(71) Applicant: Swiss Reinsurance Company Ltd., Zürich (CH)

(72) Inventors: Christopher Maximilian Merl, München (DE); Oliver Dlugosch, Traunreut (DE)

(73) Assignee: Swiss Reinsurance Company, Ltd., Zurich (CH)

( * ) Notice: Subject to any disclaimer, the term of this patent is extended or adjusted under 35 U.S.C. 154(b) by 242 days.

(21) Appl. No.: 13/707,665

(22) Filed: Dec. 7, 2012

(65) Prior Publication Data
US 2014/0019032 A1    Jan. 16, 2014

Related U.S. Application Data

(63) Continuation of application No. PCT/EP2012/063482, filed on Jul. 10, 2012.

(51) Int. Cl.
  *G08G 5/00* (2006.01)
  *G06Q 10/06* (2012.01)
  *G06Q 10/04* (2012.01)
  *G06Q 50/30* (2012.01)
  *G06Q 40/08* (2012.01)

(52) U.S. Cl.
  CPC .............. *G08G 5/0017* (2013.01); *G08G 5/00* (2013.01); *G06Q 10/06313* (2013.01); *G08G 5/0034* (2013.01); *G06Q 10/047* (2013.01); *G06Q 50/30* (2013.01); *G06Q 40/08* (2013.01)
  USPC .......................... 701/120; 701/29.3; 701/30.2

(58) Field of Classification Search
  USPC ............................... 701/120, 29.3, 30.2, 8, 51
  See application file for complete search history.

(56) References Cited

U.S. PATENT DOCUMENTS

| 6,626,077 | B1* | 9/2003 | Gilbert .......................... 89/1.11 |
| 7,379,816 | B2* | 5/2008 | Southard et al. .............. 701/300 |
| 7,835,734 | B2* | 11/2010 | Eckert et al. .................. 455/431 |
| 8,099,321 | B2* | 1/2012 | Keeler et al. ................. 705/7.35 |
| 8,266,266 | B2* | 9/2012 | Short et al. .................... 709/223 |
| 8,417,233 | B2* | 4/2013 | Woloshyn ..................... 455/418 |
| 8,626,192 | B1* | 1/2014 | Simonyi et al. ............ 455/456.1 |
| 2004/0183695 | A1* | 9/2004 | Ruokangas et al. .......... 340/945 |
| 2008/0306637 | A1* | 12/2008 | Borumand et al. ............... 701/3 |
| 2011/0099371 | A1* | 4/2011 | Roy et al. ....................... 713/168 |
| 2011/0201275 | A1* | 8/2011 | Jabara et al. ................. 455/41.2 |
| 2012/0033714 | A1* | 2/2012 | Lakkis et al. ................. 375/147 |
| 2012/0078459 | A1* | 3/2012 | Rawle .......................... 701/29.3 |

FOREIGN PATENT DOCUMENTS

| CA | 2201256 C | * | 2/2001 |
| JP | 2009081696 A | * | 4/2009 |

* cited by examiner

*Primary Examiner* — Tuan C. To
(74) *Attorney, Agent, or Firm* — Oblon, Spivak, McClelland, Maier & Neustadt, L.L.P.

(57) ABSTRACT

An avionic system including: a memory that stores a selectable hash table assigned to a flight plan of an aircraft fleet, the hash table including table elements with operational parameters of an airport, wherein airports covered by the table elements are airports flown to according the fight plan of the aircraft fleet; and a plurality of ground stations situated at the flown to airports of the fight plan, wherein the ground stations are linked via a communication network to a central processing unit; a receiver of the central processing unit that receives, via a communication network interface, a transmission from a detection device, the transmission including at least parameters regarding a time interval parameter of an airport closing and an airport identification.

16 Claims, 7 Drawing Sheets

AVIONIC SYSTEM FOR EMERGENCY INTERCEPTION IN CASE OF IMMINENT DAMAGES OF AIRCRAFT FLEETS FOLLOWING NATURAL DISASTER EVENTS

CROSS-REFERENCE TO RELATED APPLICATIONS

The present application is a continuation of PCT/EP2012/063482, filed Jul. 10, 2012, the entire contents of which are hereby incorporated by reference.

TECHNOLOGICAL FIELD

The exemplary embodiments described herein relate to an avionic system for preventing imminent grounding or damage of aircraft to fleets following natural disaster events or terroristic activities. The exemplary embodiments describe avionic systems and appropriate signal generation with automated and integrated resource-pooling systems, wherein flight interruption risks of a variable number of aircraft fleets and/or aircraft operators are sharable by providing a self-sufficient risk protection for a risk exposure of the aircraft fleets and/or aircraft operators.

BACKGROUND

Starting in the early twentieth century, the importance of air-transportation has drastically increased. Incentivized by the globalization of the markets in the last twenty years, the quantity of goods and people transported via aircraft has further increased worldwide. However, the pressure for cheap air transportation has also increased, resulting in downward pressure on prices and finally to the collapse of major airlines and aircraft operators at the beginning of the 21st century. Today, the price margins in air-transportation are extremely low, which forces the aircraft operators to a tight structure with only a small financial buffer in case of business interruption. In general, after 10 days without generating revenue in the sense of pooled returns due to performed operation, most of the major airlines would face the serious risk of being forced to stop operation or go out of business.

SUMMARY

An avionic system including: a memory that stores a selectable hash table assigned to a flight plan of an aircraft fleet, the hash table including table elements with operational parameters of an airport, wherein airports covered by the table elements are airports flown to according the fight plan of the aircraft fleet; a plurality of ground stations situated at the flown to airports of the fight plan, wherein the ground stations are linked via a communication network to a central processing unit; a receiver of the central processing unit that receives, via a communication network interface, a transmission from a detection device, the transmission including at least parameters regarding a time interval parameter of an airport closing and an airport identification, wherein the time interval parameter is saved to an operational parameter of an appropriate table element of the hash table based on the airport identification; and a filter module of the central processing unit that dynamically increments a stack with the transmitted time interval parameter based on the hash table and activates a failure deployment device in response to an incremented stack value reaching a threshold, which causes generation of an output signal to provide interruption cover of the aircraft fleet for at least a part of the time interval of the airport closing by an automated damage covering system.

A method including: creating, with a computer, a selectable hash table assigned to a flight plan of an aircraft fleet, the hash table including table elements with operational parameters of an airport, wherein the airports covered by the table elements are airports flown to according to the fight plan of the aircraft fleet; linking, with the computer and a communication network, a plurality of ground stations situated at said flown to airports of the fight plan to a central processing unit; receiving, by a receiver of said central processing unit via the communication network, a transmission from a detection device integrated in the ground stations, said transmission including at least parameters regarding a time interval parameter of an airport closing and an airport identification; and dynamically incrementing, with the computer, a stack value with the transmitted time interval parameter by a filter module of said central processing unit and activating a failure deployment device by the filter module in response to reaching a threshold, triggered on the incremented stack value, is reached, thereby generating a output signal to provide interruption cover of the aircraft fleet during at least a part of said time interval of said airport closing by an automated damage covering system.

BRIEF DESCRIPTION OF THE DRAWINGS

The accompanying drawings incorporated in and forming part is of the specification illustrate several aspects of the present embodiments, and together with the description, serve to explain in more detail, by way of example, the embodiments disclosed herein. In the drawings.

DETAILED DESCRIPTION

The present inventors have recognized that here is a genuine interest in obtaining insurance coverage to risk exposure of operation interruption. Economically, the capability to sustain longer periods of business interruption can also have the advantage of providing more securities for rating agencies or involved third parties.

An example for this demand is revealed by the newest aircraft history. The volcano activities in Iceland 2010 and the subsequent closure of airspace led to an estimated loss of $1.7 bn for the airline industry. During the period of April 15th and April 21st, almost the entire European airspace was closed resulting in cancellation of all flights in, to and from Europe. In the aftermath, the airlines seek risk transfer by means of insurance technology or state compensation or other means to cover such unforeseeable events and ensure operation of the aircraft fleets. In the state of the art, there is no non-damage coverage system available as these coverage systems are technically difficult to design due to, inter alia, (i) no standards for critical ash concentrations or that no good measurement systems exist, and (ii) the desire for broader risk transfer and coverage, not just limited to volcanic ash. The related technology should also be able to cover risk events as 1) strikes, riots etc., 2) war, hijacking, terror (for example as per AVN48), 3) pandemic-based risks. The technology should provide the conditions that the operation of aircraft fleets in the airline industry as well as airports, which have struggled heavily during the last years due to flights that were cancelled, and thus not being able to provide any source of revenues for this time, can be technically stabilized. In the case of cancelled flights, despite the fact that variable costs can be saved, the portion of fixed costs and extra costs for aircraft/crew and operations rescheduling still remain. In addition, airlines operating to and from Europe have to compensate passengers for their cancelled trips. The origin of these cancellations is either influenced by weather or the airline/airport and also Air Traffic Control (ATC). In the state of the art systems, there is no automated system or any sort of damage and operation cover providing relief in case flights are cancelled without physical damage.

An exemplary embodiment described herein provides an automated operable avionic system and the technical means and method thereof for emergency interception preventing imminent grounding or damages of aircraft fleets following natural disaster events or terroristic activities. Another exemplary embodiment described herein provides a resource-pooling system and an appropriately implemented method for the systematic and automated or at least half-automated management of risk exposure associated to the aircraft fleets. The system may provide a stable operation to threats to the survival of the system, as well as to threats undermining the operation of the system and/or limit its ability to meet the set objectives. This embodiment may implement appropriate and effective risk management features, and broadly adopt the necessary technical approach. Another exemplary embodiment describes a system, which enhances through its stable operating risk management structure, credibility and lowered risk by improved operations and increased sustainability, which allows the systems to be operated at low risk.

Figure 1:
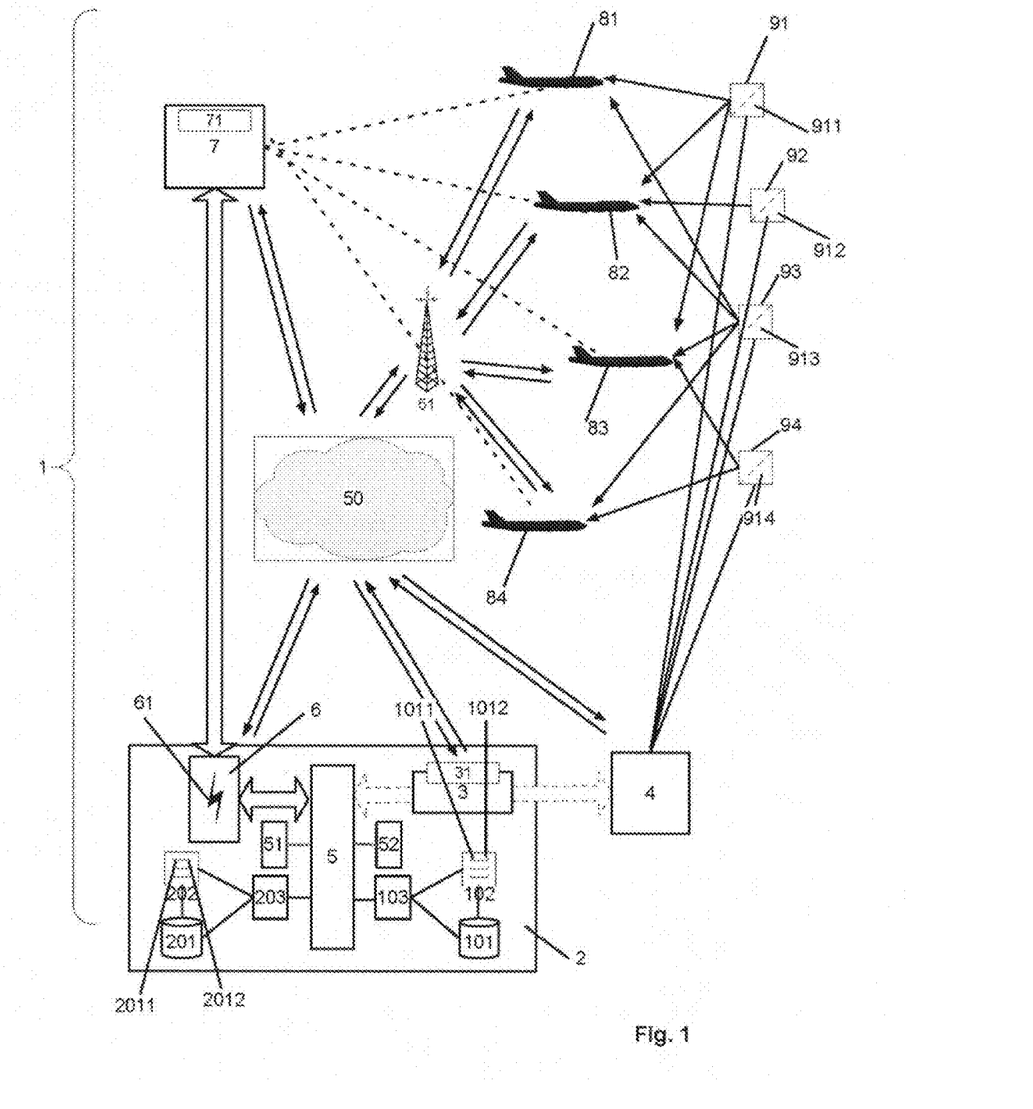
FIG. 1 shows a block diagram illustrating schematically an exemplary configuration of the underlying technical structure for the risk transfer system.

In FIG. 1, reference numeral 1 refers to an avionic system according to an exemplary embodiment, reference numeral 2 refers to a hardware based central processing unit, 3 refers to a receiver or electronic receiver module, 4 refers to a detection device, 5 refers to an appropriately realized filter module, 6 refers to a failure deployment device generating a technical output or activation signal, and 7 refers to an automated or automatically activated damage covering system operated or steered by the output signal. The avionic system 1 prevents imminent grounding or damages of aircraft fleets 81, . . . , 84 following natural disaster events, pandemics or terroristic activities. The natural disasters, leading to airport closings can comprise all possible catastrophic events, which are for example measurable based on atmospheric conditions (example: volcanic ash), meteorological conditions (example: flood, earthquake, storm, wind, rain), and/or seismic conditions (example: earthquake). However, in specific embodiment variants, the avionic system 1 can also be assigned to riots, strikes, war, pandemic events and instrument/equipment failures (e.g. GPS outage).

Figure 2:
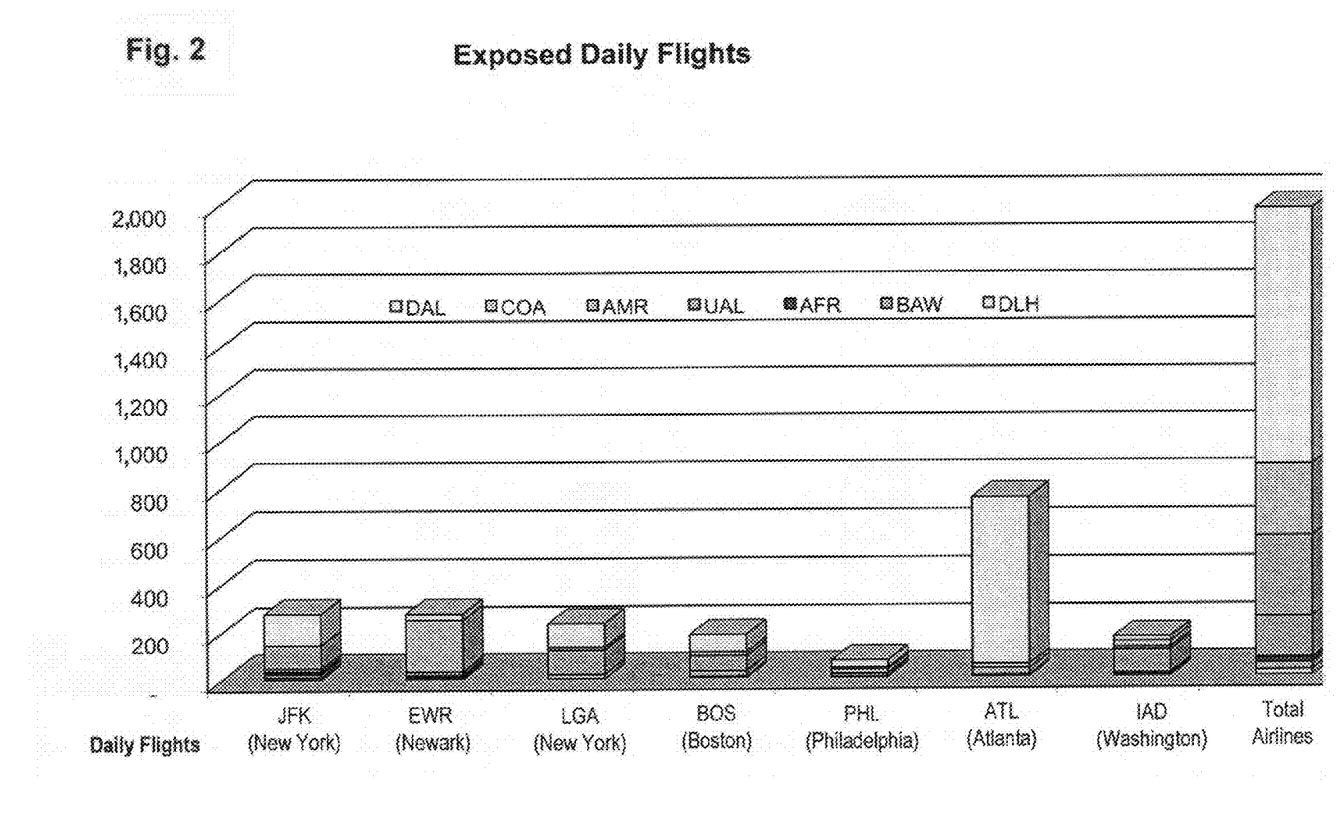
FIG. 2 shows a diagram illustrating schematically an aggregate exposure example of a possible closure of US East Coast airspace.

FIG. 2 shows schematically an aggregate exposure example of a possible closure of US East Coast airspace. 7-day closure of US East Cost Airspace and its 7 major airports will affect 19.2% of planned flights for selected airlines. The following table 1 illustrates the affected airports and closings.

TABLE 1

|  | Lufthansa (DLH) | British Airways (BAW) | Air France (AFR) | United Airlines UAL | American (AMR) | Continental Airlines (COA) | Delta Airlines (DAL) | Total Airport |
|---|---|---|---|---|---|---|---|---|
| Sample Weekly Dep | 168 | 203 | 161 | 1.232 | 2.359 | 2.093 | 7.588 | 13.804 |
| Sample Weekly Flights | 336 | 406 | 322 | 2.436 | 4.606 | 4.067 | 14.609 | 26.782 |
| Exposure Weekly | 38.365 | 10.921 | 23.805 | 7.751 | 21.780 | 15.254 | 21.687 | 139.562 |
| Share | 9% | 3.7% | 1.4% | 31.4% | 21.1% | 26.7% | 67.4% | 19.2% |

Figure 3:
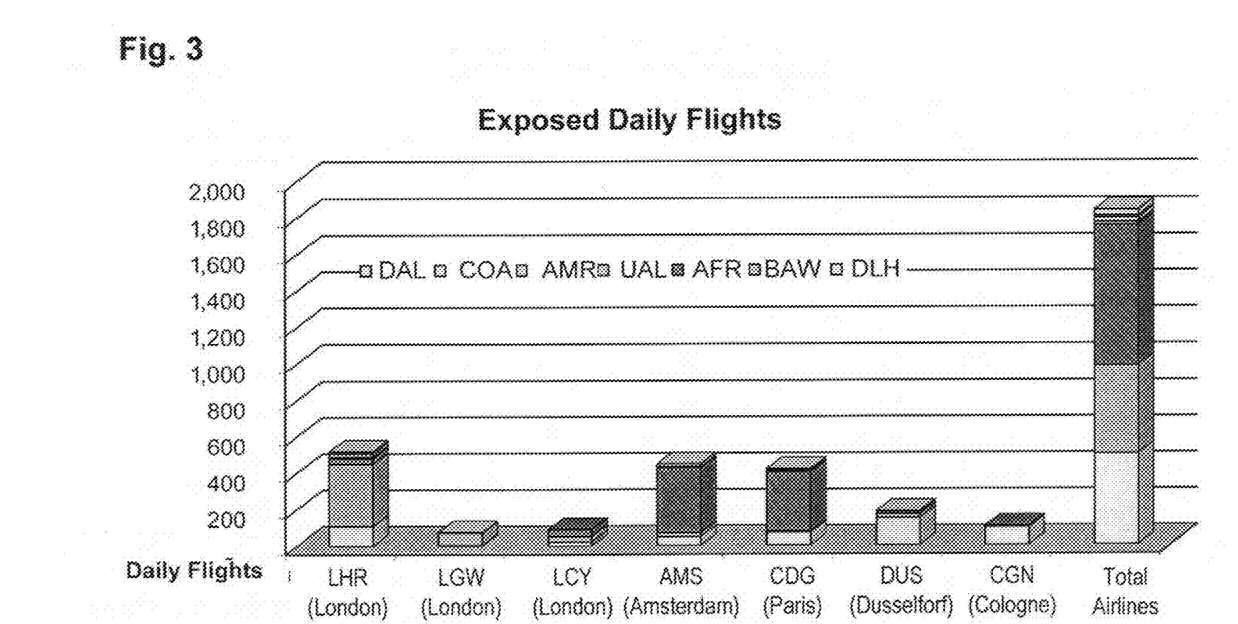
FIG. 3 shows a diagram illustrating schematically an aggregate exposure example of a possible closure of Northwest European airspace.

Further, FIG. 3 shows schematically an aggregate exposure example of a possible closure of Northwest European airspace. 7-day closure of Northwest European Airspace and its 7 major airports will affect 17.9% of planned flights for selected airlines. The following table 2 illustrates the affected airports and closings.

TABLE 2

|  | Lufthansa (DLH) | British Airways (BAW) | Air France (AFR) | United Airlines UAL | American (AMR) | Continental Airlines (COA) | Delta Airlines (DAL) | Total Airport |
|---|---|---|---|---|---|---|---|---|
| Sample Weekly Dep | 3.507 | 3.395 | 5.397 | 98 | 168 | 84 | 224 | 12.873 |
| Sample Weekly Flights | 6.895 | 6.580 | 10.416 | 196 | 336 | 168 | 448 | 25.039 |
| Exposure Weekly | 38.365 | 10.921 | 23.805 | 7.751 | 21.780 | 15.254 | 21.687 | 139.562 |
| Share | 18.0% | 60.3% | 43.8% | 2.5% | 1.5% | 1.1% | 2.1% | 17.9% |

The avionic system 1 comprises a selectable hash table 103/203, which is assigned to a flight plan 102, 202 of an aircraft fleet 81, . . . , 84. The electronically selectable hash table 103/203 comprises table elements 101/201. Each table element 101/201 comprises operational parameters of an airport 91, . . . , 94. The airports 91, . . . , 94 covered by the table elements 101, 201 are airports 91, . . . , 94, which are flown to according the fight plan 102/202 of the aircraft fleet 81, . . . , 84 by the aircrafts of the aircraft fleet 81, . . . , 84.

In the avionic system 1, at each of said flown to airports 91, . . . , 94 of the fight plan 102/202, at least one ground station 911, . . . , 914 is situated. The ground stations 911, . . . , 914 are linked via a communication network 50/51 to a central processing unit 2 of the avionic system 1. The ground stations 911, . . . , 914 may be part of an aviation system of a technical system of an operator of an aircraft fleet 81, . . . , 84, such as of an airline or air cargo/air freight transport company, but also of a manufacturer of aircraft, such as Airbus or Boeing etc., or flight monitoring services of a flight system of the airports 91, . . . , 94. The aircrafts of the aircraft fleet 81, . . . , 84 may comprise, for example, aircrafts for cargo transport and/or passenger transport and/or air ships, such as zeppelins, or even shuttles or other flight means for space travel. The aircraft fleet 81, . . . , 84 can likewise comprise motorized and non-motorized flight means, in particular gliders, power gliders, hang gliders and the like.

A receiver 3 or receiver unit 3 of the central processing unit 2 receives, via a communication network interface 31, a transmission from a detection device 4. The transmission includes at least parameters regarding a time interval parameter 1011/2011 of an airport closing and an airport identification 1012/2012. The time interval parameters 1011/2011 are saved to the operational parameter of the appropriate table element 101/201 based on the airport identification 1012/2012. The "appropriate" table element 101/201 is the table element, which includes the saved parameters of this airport 91, . . . , 94 referenced by the airport identification 1012/2012. The transmission may also include further parameters. For example, the parameters may also include log parameters of aircrafts situated at a specific airport 91, . . . , 94, for example, measured value parameters of the flight management system (FMS) and/or of the inertial navigation system (INS) and/or of the fly-by-wire sensors and/or flight monitoring devices of the aircrafts, thereby automatically detecting or verifying airport closings. The transmission can comprise an unidirectional or bidirectional end-to-end data and/or multimedia stream based transmissions for example via a packet-switched communication network, e.g. an IP network or via circuit-switched communication network using an appropriate protocol. One or more different physical network interfaces or layers can realize the communication network interface 31 of the receiver 3, which can support several different network standards. By way of example, this physical layer of the communication network interface 31 of the receiver 31 may comprise contactless interfaces for WLAN (Wireless Local Area Network), Bluetooth, GSM (Global System for Mobile Communication), GPRS (Generalized Packet Radio Service), USSD (Unstructured Supplementary Services Data), EDGE (Enhanced Data Rates for GSM Evolution) or UMTS (Universal Mobile Telecommunications System) etc. However, these may also be physical network interfaces for Ethernet, Token Ring or another Wired LAN (Local Area Network). The reference symbols 50/51 can comprise, accordingly, various communication networks, for example a Wireless LAN (based on IEEE 802.1x), a Bluetooth network, a Wired LAN (Ethernet or Token Ring), or else a mobile radio network (GSM, UMTS, etc.) or a PSTN network. As mentioned, the physical network layer of the communication network interface 31 may not only be packet-switched interfaces, as are used by network protocols directly, but also circuit-switched interfaces, which can be used by protocols such as PPP (Point to Point Protocol), SLIP (Serial Line Internet Protocol) or GPRS (Generalized Packet Radio Service) for data transfer.

In addition, the receiver 3 or the communication network interface 31, as well as the ground stations 911, . . . , 914 or appropriate processing units of the aircraft fleets 81, . . . , 84 or aircraft fleet operators, which are connected via the communication network interface 31 of the receiver unit 3 to the central processing unit 2, can comprises an identification module. Concerning the receiver 3, this identification module may be implemented in hardware or at least partially in software and may be connected to the receiver 3 by a contact-based or contactless communication network interface 31, or may be integrated in the receiver 3. The same is true for the other mentioned communication network interfaces, as the network communication interfaces connecting related aviation systems or processing units of the aircraft fleets 81, . . . , 84 or aircraft fleet operators. In particular, the identification module may be in the form of a SIM card, as are known from the GSM standard. This identification module can contain, inter alia, the authentication data, which are relevant for authenticating the related device in the network 50/51. These authentication data may comprise, in particular, an IMSI (International Mobile Subscriber Identifier) and/or TMSI (Temporary Mobile Subscriber Identifier) and/or LAI (Location Area Identity) etc., which are based on the GSM standard. With the additional implementation of such identification modules, the avionic system 1 can completely be automated including the generation and transmission of the output signal 61 by means of the failure deployment device 6 and the covering by the automated damage covering system 7.

Tables 3 to 6 show an example with a monetary based automated damage covering system 7 with the dedicated range of different events covered by the avionic system 1. The automated damage covering system 7 is initiated, controlled and/or steered by the generated output signal 61.

TABLE 3

| | |
|---|---|
| Maximum Payout Amount | 15,000,000 |
| Cancelled Departure XS point | 400 |
| Payout per cancelled dept | 15'000 |
| Exponential Dist Lambda = | 0.35 |
| Option 1: 10 Day Franchise + 10 Days | |
| Overall Expected Loss | 101,258 |
| | Assumption: Volcano activity in Iceland lasting more than 7 days one in every 20 years. Probability of wind bring ash cloud to Europe = 12% |
| Probability of Event occurring | 12% |
| Planned per day | 85 |
| Cancelled per day | 73.95 |

TABLE 3-continued

| Volcano Europe - 5 major | Payout | Expected Loss |
|---|---|---|
| 0.29531191 | | |
| 0.503414696 | | |
| 0.650062251 | | |
| 0.753403036 | | |
| 0.826226057 | | |
| 0.877543572 | | |
| 0.913706414 | | |
| 0.939189937 | | |
| 0.957147873 | | |
| 0.969802617 | | |
| 0.978720264 | 14,355,000 | 15,362 |
| 0.985004423 | 15,000,000 | 11,311 |
| 0.989432796 | 15,000,000 | 7,971 |
| 0.992553417 | 15,000,000 | 5,617 |
| 0.994752482 | 15,000,000 | 3,958 |
| 0.996302136 | 15,000,000 | 2,789 |
| 0.997394159 | 15,000,000 | 1,966 |
| 0.998163695 | 15,000,000 | 1,385 |
| 0.998705978 | 15,000,000 | 976 |
| 0.999088118 | 15,000,000 | 2,329 |
| Expected Loss | | 53,665 |

TABLE 4

| | | |
|---|---|---|
| Exponential Dist Lambda = | | 0.2 |
| | | Assumption: Fire in 100% of years, 1 in 10 closes airport at all. If closed will last longer than 7 days in 20% of cases |
| Probability of Event occurring | | 10% |
| Planned per day | | 85 |
| Cancelled per day | | 5 |

| Brush Fire | Payout | Expected Loss |
|---|---|---|
| 0.181269247 | | |
| 0.329679954 | | |
| 0.451188364 | | |
| 0.550671036 | | |
| 0.632120559 | | |
| 0.698805788 | | |
| 0.753403036 | | |
| 0.798103482 | | |
| 0.834701112 | | |
| 0.864664717 | | |
| 0.889196842 | 970,588 | 2,381 |
| 0.909282047 | 1,058,824 | 2,127 |
| 0.925726422 | 1,147,059 | 1,886 |
| 0.939189937 | 1,235,294 | 1,663 |
| 0.950212932 | 1,323,529 | 1,459 |
| 0.959237796 | 1,411,765 | 1,274 |
| 0.96662673 | 1,500,000 | 1,108 |
| 0.972676278 | 1,588,235 | 961 |
| 0.977629228 | 1,676,471 | 830 |
| 0.981684361 | 1,764,706 | 3,948 |
| Expected Loss | | 17'637 |

TABLE 5

| | | |
|---|---|---|
| Exponential Dist Lambda = | | 0.29 |
| | | Assumption: Volcanic Eruption closing airport 1 in 7 years, 20% of these will last longer than 7 days |
| Probability of Event occurring | | 14% |
| Planned per day | | 85 |
| Cancelled per day | | 4.7 |

| Volcano Canary | Payout | Expected Loss |
|---|---|---|
| 0.251736432 | | |
| 0.440101633 | | |
| 0.581048451 | | |
| 0.686513819 | | |
| 0.765429712 | | |
| 0.824479599 | | |
| 0.868664479 | | |
| 0.901726414 | | |
| 0.926465456 | | |
| 0.94497678 | | |
| 0.958828129 | 912,353 | 1,805 |
| 0.969192589 | 995,294 | 1,474 |
| 0.976947937 | 1,078,235 | 1,195 |
| 0.982750981 | 1,161,176 | 963 |
| 0.987093187 | 1,244,118 | 772 |
| 0.990342302 | 1,327,059 | 616 |
| 0.992773497 | 1,410,000 | 490 |
| 0.994592671 | 1,492,941 | 388 |
| 0.995953893 | 1,575,882 | 306 |
| 0.996972445 | 1,658,824 | 959 |
| Expected Loss | | 8'967 |

TABLE 6

| | | |
|---|---|---|
| Exponential Dist Lambda = | | 0.2 |
| | | Assumption: Unknown event causing 7% of flights to be cancelled 14 days happens every 10 years |
| Probability of Event occurring | | 10% |
| Planned per day | | 85 |
| Cancelled per day | | 5.95 |

| Other | Payout | Expected Loss |
|---|---|---|
| 0.181269247 | | |
| 0.329679954 | | |
| 0.451188364 | | |
| 0.550671036 | | |
| 0.632120559 | | |

TABLE 6-continued

| | | |
|---|---|---|
| 0.698805788 | | |
| 0.753403036 | | |
| 0.798103482 | | |
| 0.834701112 | | |
| 0.864664717 | | |
| 0.889196842 | 1,155,000 | 2,833 |
| 0.909282047 | 1,260,000 | 2,531 |
| 0.925726422 | 1,365,000 | 2,245 |
| 0.939189937 | 1,470,000 | 1,979 |
| 0.950212932 | 1,575,000 | 1,736 |
| 0.959237796 | 1,680,000 | 1,516 |
| 0.96662673 | 1,785,000 | 1,319 |
| 0.972676278 | 1,890,000 | 1,143 |
| 0.977629228 | 1,995,000 | 988 |
| 0.981684361 | 2,100,000 | 4,698 |
| Expected Loss | | 20,989 |

In the above mentioned embodiment variant, for registering the communications network interfaces with an associated identification module for unidirectional or bidirectional unicast or multicast end-to-end data and/or multimedia stream transmissions, the avionic system 1 can comprise a registering network node with a register unit by using a request to request a data link to one or more of the communication network interfaces from the central processing unit 2 via the contact-based or contactless communication network interface 31. In principle, point-to-point connection (unicast) is intended to be understood to mean all direct connections between two network interfaces from point-to-point. This covers both point-to-point and end-to-end connections. On the example of the avionic system 1, the point-to-point connections can also work without an actual switching intermediate unit. The interfaces can cover communication in the lower network layers (1-3 in the OSI model). End-to-end connections also cover all connections on the higher network layers ((4-7 in the OSI model). In the case of end-to-end communication, an intermediate station can also be used for the transmission. In the embodiment variant of a multicast-based transmission, multicast denotes data transmission in groups (multipoint connection). Therefore, an appropriate multicast setting can be used in the avionic system 1 for dedicated transmission between the communication network interface 31 of the receiver 3 and associated aviation systems of the pooled aircraft fleets 81, . . . , 84.

In the embodiment variant y, the receiver 3 comprise an identification module as e.g. a SIM card for storing an IMSI. The communication network interfaces or the aviation systems of the pooled aircraft fleets 81, . . . , 84 can also comprise a transmitter that transmits the IMSI for example to the registration module of the avionic system 1 on request. The IMSI can so be stored in an appropriate user database of the registration module. To authenticate an identification, the registration module can use the extensible authentication protocol, for example. In case of GSM-based authentication using a location register, the avionic system 1 can also comprise an appropriate signaling gateway module for complementing the logical IP data channel to form signal and data channels in a GSM network to such a location register. A MAP gateway module can be used to generate the necessary SS7/MAP functions for authenticating the interfaces or rather the transmitted identification stored at the corresponding identification module. The registration module authenticates the at least one communication network interface using the user database, e.g. of the location register, and the signaling gateway module on the basis of the IMSI of the SIM card. Upon successful authentication being stored in the user database of the registration module, an appropriate entry is stored and/or the data link to the one or more communication network interfaces can be set up by the receiver 3 and/or the processing unit 2.

A filter module 5 of the central processing unit 2 dynamically increments a stack with the transmitted time interval parameters 1011/2011 based on the hash table 103/203, i.e. by getting the parameters from the saved parameters of the hash table 103/203. The filter module 5 activates a failure deployment device 6, if a threshold, triggered on the incremented stack value, is reached. The threshold, triggered on the incremented stack value, can preferably be set to bigger or equal than 5 and smaller or equal than 10 days. However, the threshold can also be dynamically adaptable based on measured values of the aircraft fleet 41, . . . , 44 of empirically derived values. In an embodiment variant, the starting point of an event, which is also the starting point to increment a new stack, can be triggered based on the first authority issuing an instruction for the closure of airspace for one specific event. In big events, it is very possible that authorities based in different locations are issuing similar instructions based on the same event. The end-point of an event, which also ends the incrementing of a specific stack related to the event, can for example be triggered by the last authority that opens their airspace again. Interim periods, in which airspace is not closed in any one location for this event do not need to be measured, but could be.

The avionic system 1 is easily adaptable to further border conditions. For natural catastrophe, such conditions may include additional trigger thresholds as e.g. in the case of earthquakes that the quake hast to be over 7 on the Richter Scale and located exactly below or close to an airport. Concerning volcanic eruptions, if the trigger is set to measuring parameter of the eruption, also wind conditions have to be considered. For example, for Iceland's volcanoes, which are the most active in Europe, the winds blow the clouds only 6% of the time towards Europe. Further, in an embodiment variant, the avionic system 1 can also cover special cases, as for example, the case of long-term closure of airports. Long term closure of airports 91, . . . , 94, instead of closure of airspace, can result in transfer-flights or replacement flights (example Munich airport is closed for 6 months and Innsbruck and Salzburg airport are used as a "substitute" airport) and may be excluded or included for a pro rata calculation by setting appropriate operational parameters of the avionic system 1. The closure of airspace may be defined as a local authority issuing the instruction to close airspace. In case of an earthquake or major flooding, it is likely that instead of airspace the authorities will close one or more airport 91, . . . , 94, which for the coverage by the avionic system 1 can be supposed to be treated similar. Small airspaces, which fall below a certain size, can for example also be excluded from the definition to avoid to trigger the cover by a very small airport/airspace. Any computer program code of the avionic system 1 stored as a computer program product on a non-transitory storage medium to steer and control the central processing unit 2 of the avionic system 1, the receiver 3 or electronic receiver module, the detection device 4, the filter module 5, the failure deployment device 6 generating the output or activation signal, and/or the automated or automatically activated damage covering system 7 may be realized as a software module programmed in any program language, for example in Java (Java is a registered trademark of Sun Microsystems), and may even comprise even one or more script modules for a conventional spreadsheet application such as Microsoft Excel. In the following paragraphs, described are with reference to FIG. 1 may also serve the man skilled in the art to realize the partly or as whole software-based various functions executed by the avionic system 1 when said central processor unit 2 is controlled or steered by the computer program of computer program product. However, the man skilled in the art also understands that all this functions can be realized with only hardware to achieve related technical advantages as speed, stability and the same.

If the failure deployment device 6 is initiated by the filter module 5, the failure deployment device 6 generates an output signal 61 to provide interruption cover of the aircraft fleet 41, . . . , 44 for at least a part of said time interval of said airport closing by an automated damage covering system 7. The generated output signal 61 can be transmitted via the communication networks 50/51 from the failure deployment device 6 to the damage covering system 7 or directly by a signaling connection. If the automated damage covering system 7 is monetary based, the capacity of the automated damage covering system 7 can be set to any definable value, e.g. a $1 billion cover in total for a 12-month period. The scope of the avionic system can be laid up to 10 policies with $100 m to major airlines. However, other scopes are also imaginable. A policy here means from the technical aspect, the corresponding aircraft fleet 81, . . . , 84 is assigned to the avionic system 1 by creating the appropriate communication connections, database entries, signaling conditions and cover by the damage covering system 7 etc. However, the automated damage covering system 7 must not necessary be monetary based but can comprise other means for the covering as e.g. a physical alarm, or automated technical support to recover the aircraft fleet 81, . . . , 84 for a possible damage due to the catastrophic event. The avionic system may comprise a dynamic or automated pricing by means of predefined rules, as e.g. the use of a 3% rate on line as WAP with 10 days waiting period, MFP 3% RoL with 7 days excess. The selected aircraft fleets 81, . . . , 84 can be restricted to a specific region, i.e. regionally spread to US, Europe, Asia, or unlimited by region to possible world wide assignment of aircraft fleets 81, . . . , 84.

In an embodiment variant, the output signal can, e.g., only be generated, if the transmission comprises a definable minimum number of airport identifications with airport closings. Such an definable minimum number can be created due to a minimum size in the geographic spread of the closed airports of the flight plan. It therefore can serve as a minimum threshold for a minimum of affected airports 91, . . . , 94 of a fight plan 102/202 of an specific aircraft fleet 41, . . . , 44. This minimum threshold value can also be set independent of a specific aircraft fleet 41, . . . , 44, triggering simply on the number of closed aircraft fleet 41, . . . , 44 due to a certain natural disaster events, terroristic activities and/or other catastrophic event. The output signal can be automatically generated by the avionic system 1 for a dynamically scalable damage covering of the aircraft fleet 41, . . . , 44 with a definable upper coverage limit. The upper coverage limit can for example be set to smaller or equal to US$ 100 million. The output signal 61 generated by the failure deployment device 6 can for example be generated pro rata according to the number of cancelled flights or e.g. by the number of cancelled flights/number of scheduled flights for the period in which airspace is closed multiplied by the limit. However, the man skilled in the art knows that these are only examples, and that the avionic system 1 can easily be adapted to other operational needs.

In certain embodiment variants, the failure deployment device 6 for automatic failure elimination can also directly be activated by a switching device of the ground station 911, . . . , 914 if an airport closing is detected e.g. by a sensor. The automated damage covering system 7 and/or the failure deployment devices 6 may comprise, for example, automated emergency and alarm signal devices with or without monetary-value based transmission modules. For example, at least in some cases for detecting an airport closing, a dedicated sensor or measuring device can be integrated into the aviation system of the airports 91, . . . , 94 and/or the ground station 911, . . . , 914 and/or landing strip. The failure deployment device 6 may be, for example, checking or alarm devices or systems for direct intervention in the affected aircraft fleets 81, . . . , 84 or at the operator of an aircraft fleet 81, . . . , 84, which is affected on detection of corresponding failures. Of course, a plurality of aircraft fleets 81, . . . , 84 may simultaneously be affected or be covered by the avionic system 1.

Further, the automated damage covering system 7 can be realized by a resource-pooling system integrated to the avionic system 1. With the resource-pooling system, flight interruption risks for of a variable number of aircraft fleets 41, . . . , 44 and/or aircraft operators is sharable, whereas the avionic system 1 provides a self-sufficient risk protection for a risk exposure of the aircraft fleets 41, . . . , 44 and/or aircraft operators by the resource-pooling system. The risk-pooling system can for example be technically realized by comprising at least an assembly module to process risk related aircraft fleet data and to provide the likelihood for the risk exposure to a pooled aircraft fleet 41, . . . , 44 based on the risk related aircraft fleet data. In this embodiment variant, the pooled aircraft fleets 41, . . . , 44 can be connected to the resource-pooling system by a plurality of payment receiving modules configured to receive and store payments from the aircraft fleets 41, . . . , 44 for the pooling of their risks and wherein the payments are automated scaled based on the likelihood of the risk exposure of a specific aircraft fleet 41, . . . , 44.

In an embodiment variant, the variable number of pooled aircraft fleets 81, . . . , 84 can be self-adaptable by the avionic system 1 to a range where not-covariant occurring risks covered by the avionic system 1 affect only a relatively small proportion of the totally pooled risk exposure of the aircraft fleets 81, . . . , 84 at a given time. In an embodiment variant, the avionic system 1 can for example further comprise a payment is receiving module configured to receive and store a principal payment from a third party investor for a financial product linked to the avionic system 1 and a payment module configured to determine a bonus payment for the third party investor and a return interest payment for the investor when the pooled resources of the pooled aircraft fleets 81, . . . , 84 exceed a predefined threshold value due to a low frequency of losses occurred.

The filter module 5 may comprise an integrated oscillator that generates an electrical clock signal having a reference frequency, the filter module 5 being capable periodically filtering the table elements 101/201 of the selectable hash table 103/203 on the basis of the clock signal. So, the stack can be determined dynamically or partly dynamically by the filter module 5 on the basis of the detected closings of airports 91, . . . , 94.

Note that the avionic system 1 can easily be realized to be resistant against systematic risk or risk based on moral hazard. If for example a majority of aircraft fleets 81, . . . , 84 and/or airports in a certain region get pooled to an avionic system 1 according to the invention, a total system failure could aggregate losses, which can reduce the operation of the avionic system 1. The operation of aircraft fleets 81, . . . , 84 by the airlines is a dense web of scheduling, placing aircraft, personnel and resources, an aircraft fleet 81, . . . , 84 respectively the airline always bears a certain financial impact when flights are cancelled or aircraft have to stay on the ground for various reasons. Therefore, the worst impact for an aircraft fleet is the disruption in it's entire network after a few hours or days of outage, where planes have to be relocated, crews have to exchanged due to long hours worked or wrong locations and the weekly maintenance has to be rescheduled. Even in case of low utilized flights (low load factors) to cancel a flight out of economic reasons would be reasonable but the resulting disruptions in the network are far greater than the gain of saving a few variable costs. Out of these many reasons, the likelihood of moral hazard, meaning aircraft fleets abusing the avionic system cover to compensate for their own bad business is extremely low. Further systematic risk for the operation of the avionic system 1 can for example be treated as follows: (i) aircraft crashing: Single aircraft crashing does not typically result in many flight cancellations despite the fact that the avionic system can be realized to only cover non-physical events; (ii) aircraft breakdowns: Aircraft breakdowns due to mechanical reasons happen quite frequently. However, for these cases, an aircraft fleet 81, . . . , 84, respectively, and the airline typically face tremendous operational and reputational problems which could not be solved financially. Therefore, the aircraft fleet operators normally have a higher interest to operate flights than to misuse an assigned avionic system 1 for damage covering; (iii) nuclear risk: Nuclear risks can be excluded by an appropriate setting of the avionic system 1. Additionally, aircraft fleets 81, . . . , 84 would cancel flights in the affected area only for a short term as the impact is very limited to air-transportation; (iv) low demand: Low demand on a certain route would be a possibility of abuse of the avionic system 1. However, since the aircraft fleet operators need the aircraft on the return leg, the aircraft fleet operators would normally not cancel single flights due to low demand. If routes are replaced by other routs the overall number of scheduled flights does not change; (v) grounding: Local authorities can enforce a grounding of an entire aircraft fleet 81, . . . , 84 due to inherent design failures or faulty maintenance of the aircraft fleet 81, . . . , 84. Since this can be influenced by the aircraft fleet operator and can have a huge effect on the number of cancelled flights, the avionic system can e.g. be designed to exclude such events from the cover; (vi) weather: Cancellation due to weather is the most common reason of cancellation with the highest impact. The aircraft fleet operators or the airports operators cannot influence these cancellations. Therefore, the operation of the avionic system 1 can for example be ensured by setting appropriate condition parameters for the frequency and/or severity of the natural catastrophic event; (vii) strike; Strike by the employees of the aircraft fleet operator or the airports are the second highest risk with a strong impact on the flight schedule. However, due to the operational and reputational issues, the desire to avoid any strike is typically bigger that the incentive to misuse the avionic system 1 by wrongly claiming relief by means of cover by the avionic system 1; (viii) ATC: Cancellations due to ATC happen if the controller induce a quote on flights during a brief period in order to safely coordinate the remaining flights. This also lies outside the control of the aircraft fleet operators or the airport operators, but has normally a minor impact on the number of total cancellations and therefore on the operation of the avionic system 1; (ix) insolvency and war/terror: Insolvency is one of the biggest threats for an aircraft fleet operator, but is completely in it's control. Thus, for the realization of an avionic system 1, the exclusion by setting appropriate border condition parameters can be mandatory. War and terrorism is another threat, which can also be excluded by setting appropriate border condition parameters in the avionic system 1.

Additional fraud prevention can be achieved, in that the filter module 5 of the central processing unit 2 comprises an additional trigger device triggering if the transmission from the detection device 4 is induced by an applicable third party, whereas if the airport closing is third-party induced dynamically increments the stack with the transmitted time interval parameters 1011, 2011 and otherwise leaves the stack unchanged, which obviates incrementing of the stack. Third-party induced, i.e. induced by an applicable third party, means that the airport is closed based on intervention of a state authority as for example the official aeronautical authority, police or military intervention. In general, the additional trigger device can e.g. also trigger if the airport closing is not self-induced respectively induced by external effects (e.g. complete closing of the airspace), authorities etc., which are not under the control of the airport operator. Applicable means that the third parties, which are triggered on by means of the trigger device are definable as system variables either as predefined parameters or as parameter, which can be accessed by the system, for example over the network from an appropriate data server on request or periodically. This embodiment variant as inter alia the advantage that the systems becomes stable against possible fraud or arbitrary acts by the airport operator.

Figure 4:
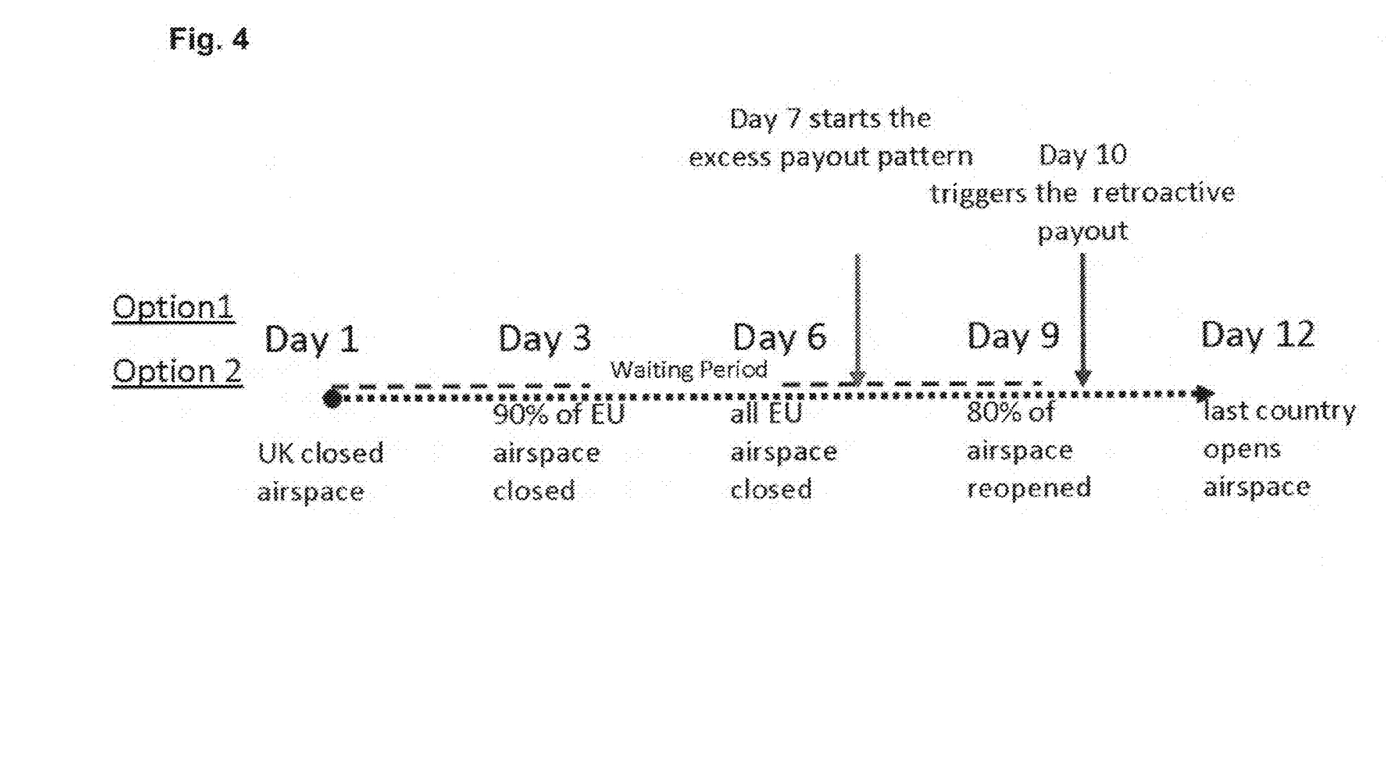
FIG. 4 and FIG. 5 show diagrams illustrating schematically a sequence of steps of an exemplary method.
Figure 5:
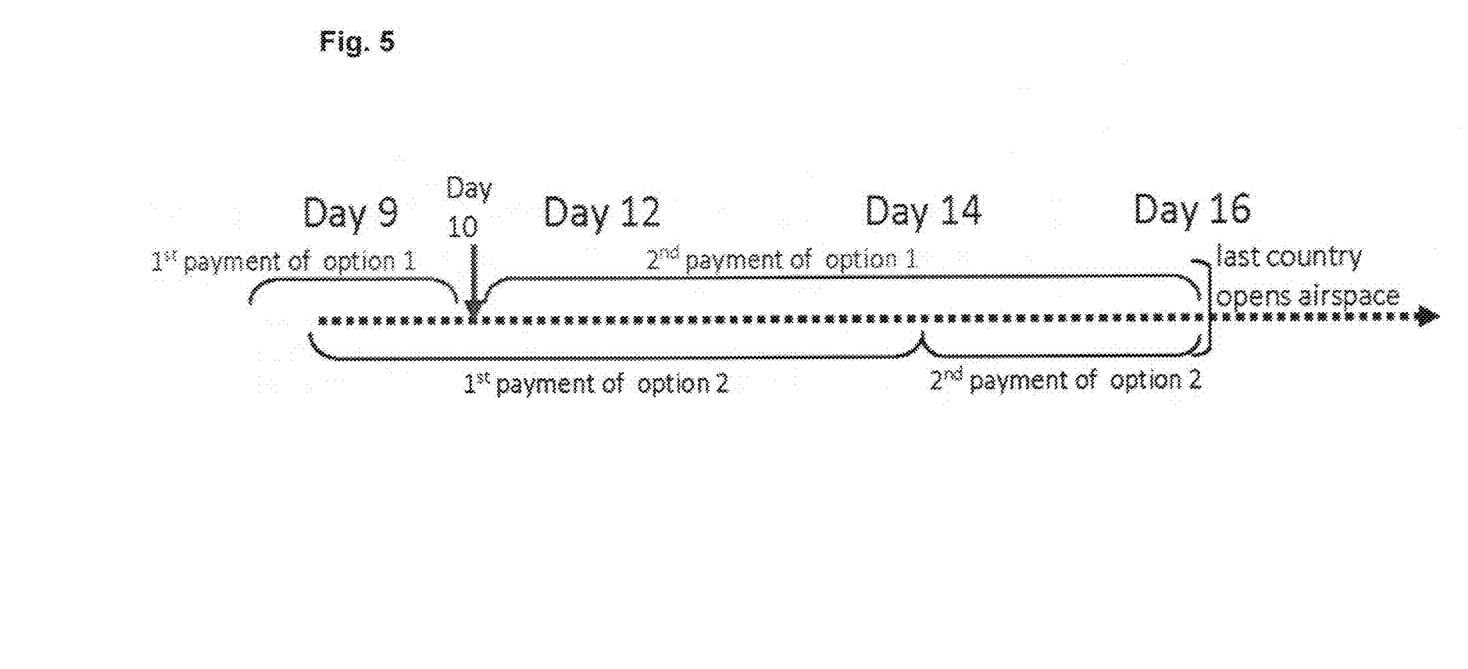

FIG. 4 and FIG. 5 show a diagram illustrating schematically a sequence of steps. FIG. 4 shows an exemplary waiting period of 10 days, i.e. the avionic system triggers on the time interval of 10 days for example after the first closing of an airport. The damage covering output signal can be generated e.g. based on (Number of canceled flights during the period)/(Number of planned flights during the 7/10 days), initiating for example an automated payout. This is that the trigger of the avionic system 1 or rather the filter module 5 activates the automated damage covering system 7 by means of the output signal 61 of the failure deployment device 6. FIG. 5 shows exemplary an avionic system, where for example the automated pay-out is initiated if the airport closures are bigger than a trigger threshold value, based on (Number of canceled flights in the closed period>trigger)/(Number of planned flights during the period).

Figure 6:
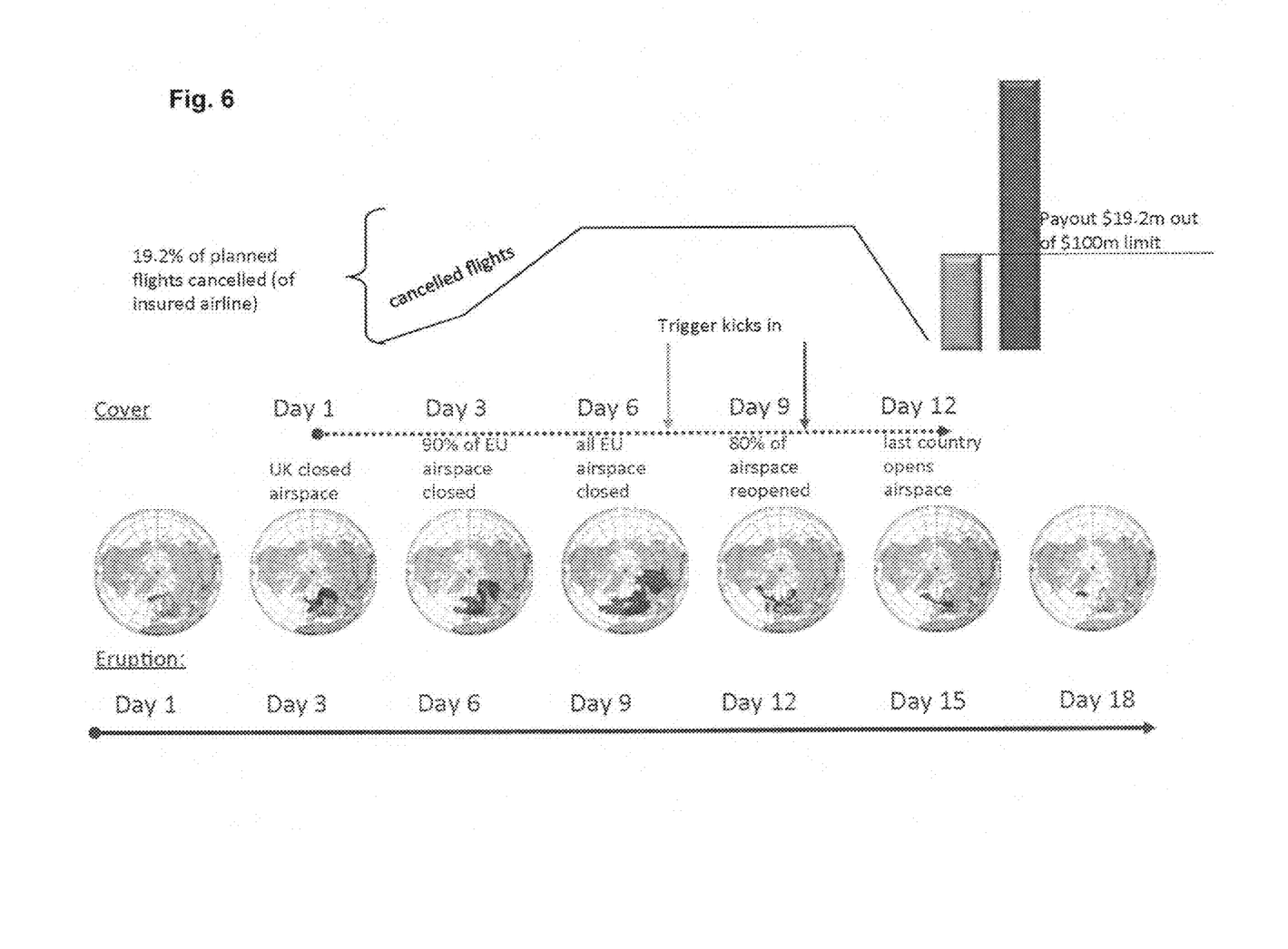
FIG. 6 shows a diagram illustrating schematically a time sequence of an event where 19.2% of planned flights were cancelled (of insured airline)

FIG. 6 shows a diagram illustrating schematically a time sequence of an event where 19.2% of planned flights were cancelled (of insured airline). The number of cancelled flight can lead to an output signal 61 initiating for example the covering of an automated payout $19.2 m out of an absolute covering threshold of $100 m limit of the related avionic system 1. FIG. 6 shows where the threshold is triggered due to the proceeding of the catastrophic eruption event.

Figure 7:
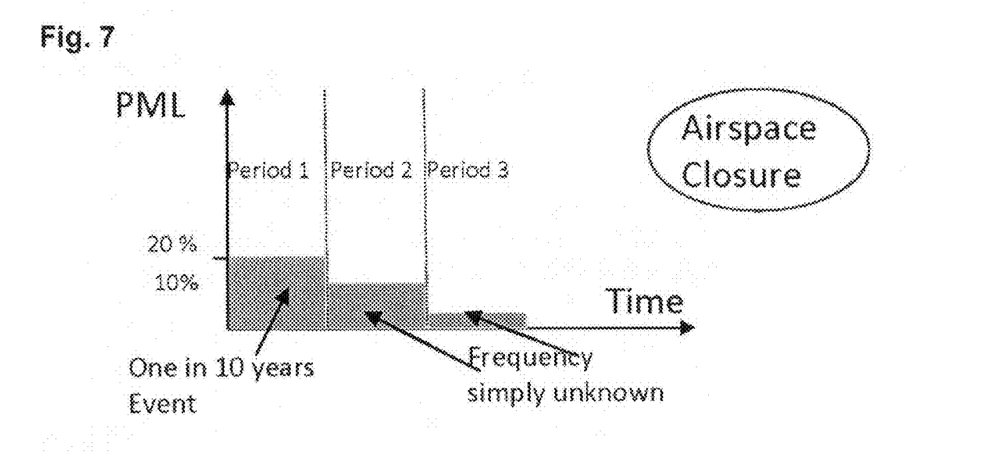
FIG. 7 and FIG. 8 show diagrams illustrating schematically exemplary underlying probability estimates.
Figure 8:
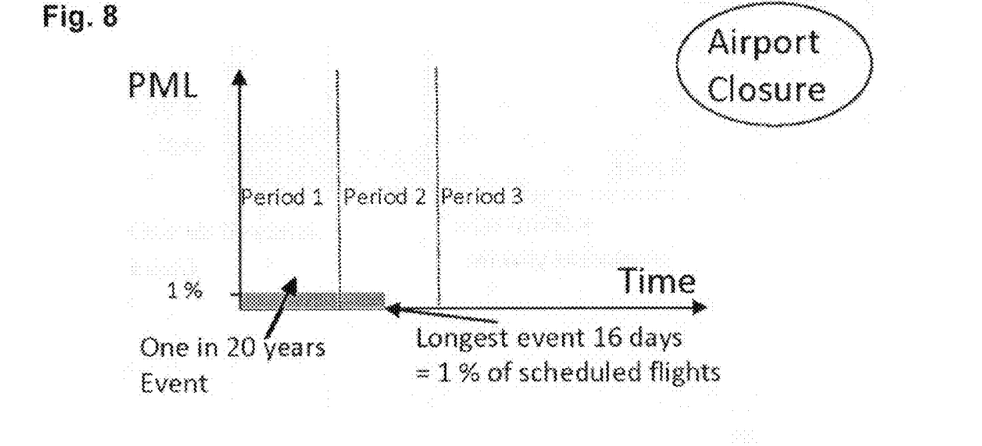

FIG. 7 and FIG. 8 show diagrams illustrating schematically exemplary underlying probability estimates. FIG. 7 illustrates an estimate for events of airspace closure which are longer than 10 days, i.e. >10 days, while FIG. 8 illustrates an estimate for events of airspace closure which are longer than 2 days, i.e. >2 days. The example of FIG. 7 is based on the EU-wide closure of 2010 due to volcanic ash clouds of 6 days. FIG. 8 is based on the examples of the hurricane affecting New Orleans in 2005 by providing airport closings of 16 days and of the hurricane affecting Ft.

The invention claimed is:
1. An avionic system comprising:
a memory that stores a selectable hash table assigned to a flight plan of an aircraft fleet, the hash table including table elements with operational parameters of an airport, wherein airports covered by the table elements are airports flown to according the fight plan of the aircraft fleet;

a plurality of ground stations situated at said flown to airports of the fight plan, wherein the ground stations are linked via a communication network to a central processing unit;

a receiver of said central processing unit that receives, via a communication network interface, a transmission from a detection device, said transmission including at least parameters regarding a time interval parameter of an airport closing and an airport identification, wherein the time interval parameter is saved to an operational parameter of an appropriate table element of the hash table based on the airport identification; and a filter module of said central processing unit that dynamically increments a stack with the transmitted time interval parameter based on the hash table and activates a failure deployment device in response to an incremented stack value reaching a threshold, which causes generation of an output signal to provide interruption cover of the aircraft fleet for at least a part of said time interval of said airport closing by an automated damage covering system.

2. The system according to claim 1, wherein said threshold, triggered on the incremented stack value, is bigger or equal to 5 days and smaller or equal to 10 days.

3. The avionic system according to claim 1, wherein said output signal is only generated, if said transmission comprises a definable minimum number of airport identifications assigned to airport closings thus creating an implicit geographic spread of closed airports of the flight plan.

4. The avionic system according to claim 1, wherein said output signal is automatically generated by the avionic system for a dynamically scalable damage covering of the aircraft fleet with an definable upper coverage limit.

5. The avionic system according to claim 4, wherein said upper coverage limit is set to be smaller or equal to US$ 100 million.

6. The avionic system according to claim 1, wherein the automated damage covering system includes a resource-pooling system, wherein flight interruption risks for of a variable number of aircraft fleets or aircraft operators is sharable by providing a self-sufficient risk protection for a risk exposure of the aircraft fleets or aircraft operators by the resource-pooling system.

7. The avionic system according to claim 6, wherein the risk-pooling system comprises an assembly module to process risk related aircraft fleet data and to provide a likelihood for said risk exposure of a pooled aircraft fleet based on the risk related aircraft fleet data, wherein the aircraft fleets are connected to the resource-pooling system by a plurality of payment receiving modules configured to receive and store payments from the pooled aircraft fleets for the pooling of their risks and wherein the payments are automatically scaled based on the likelihood of said risk exposure of a specific aircraft fleet.

8. The avionic system according to claim 1, wherein the filter module of said central processing unit comprises an additional trigger device that triggers in response to said transmission from the detection device being induced by a third party, the transmission of the parameters includes said time interval parameter of the airport closing and the airport identification, and if the airport closing is third-party induced, dynamically incrementing the stack with the transmitted time interval parameters while otherwise leaving the stack unchanged.

9. A method comprising:

creating, with a computer, a selectable hash table assigned to a flight plan of an aircraft fleet, the hash table including table elements with operational parameters of an airport, wherein the airports covered by the table elements are airports flown to according to the to fight plan of the aircraft fleet;

linking, with the computer and a communication network, a plurality of ground stations situated at said flown to airports of the fight plan to a central processing unit;

receiving, by a receiver of said central processing unit via the communication network, a transmission from a detection device integrated in the ground stations, said transmission including at least parameters regarding a time interval parameter of an airport closing and an airport identification; and dynamically incrementing, with the computer, a stack value with the transmitted time interval parameter by a filter module of said central processing unit and activating a failure deployment device by the filter module in response to reaching a threshold, triggered on the incremented stack value, is reached, thereby generating a output signal to provide interruption cover of the aircraft fleet during at least a part of said time interval of said airport closing by an automated damage covering system.

10. The method according to claim 9, further comprising setting said threshold to be bigger or equal to 5 days and smaller or equal to 10 days.

11. The method according to claim 9, wherein said generating said output signal only, if said transmission comprises a definable minimum number of airport identifications assigned to airports with airport closings thus creating an implicit geographic spread of the closed airports of the flight plan.

12. The method according to claim 9, wherein said generating said output signal is generated for a scalable automated damage covering of the aircraft fleet with an definable upper coverage limit.

13. The method according to claim 12, further comprising setting said upper coverage limit to be smaller or equal to US$ 100 million.

14. The method according to claim 9, wherein the automated damage covering system includes a resource-pooling system integrated to the avionic system, and the method further sharing, by the resource-pooling system, flight interruption risks for at least one of a variable number of aircraft fleets or aircraft operators by providing at least one of a self-sufficient risk protection for a risk exposure of the aircraft fleets or aircraft operators by the resource-pooling system.

15. The method according to claim 14, wherein the method further comprises:

processing risk related aircraft fleet data, providing a likelihood for said risk exposure for a pooled aircraft fleet based on the risk related aircraft fleet data, connecting the aircraft fleets to the resource-pooling system by a plurality of payment receiving modules configured to receive and store payments from said pooled aircraft fleets for the pooling of their risks, and automatically scaling the payments based on a likelihood of said risk exposure of a specific aircraft fleet.

16. The method according to claim 9, wherein the filter module of said central processing unit comprises an additional trigger device triggering if said transmission from the detection device is induced by an applicable third party, and if the airport closing is third-party induced then dynamically incrementing the stack with the transmitted time interval parameters and otherwise leaving the stack unchanged.

* * * * *